United States Patent
Somani

(10) Patent No.: US 10,054,959 B2
(45) Date of Patent: *Aug. 21, 2018

(54) REAL TIME DIAGNOSTICS FOR FLOW CONTROLLER SYSTEMS AND METHODS

(71) Applicant: Bhushan Somani, Yorba Linda, CA (US)

(72) Inventor: Bhushan Somani, Yorba Linda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/260,834

(22) Filed: Sep. 9, 2016

(65) Prior Publication Data

US 2017/0023951 A1    Jan. 26, 2017

Related U.S. Application Data

(63) Continuation of application No. 14/210,113, filed on Mar. 13, 2014, now Pat. No. 9,454,158.

(51) Int. Cl.
| | |
|---|---|
| *G05D 7/06* | (2006.01) |
| *G01F 15/00* | (2006.01) |
| *G01F 15/06* | (2006.01) |
| *G01F 1/34* | (2006.01) |
| *G01F 1/68* | (2006.01) |

(52) U.S. Cl.
CPC ............. *G05D 7/0635* (2013.01); *G01F 1/34* (2013.01); *G01F 1/68* (2013.01); *G01F 15/003* (2013.01); *G01F 15/005* (2013.01); *G01F 15/06* (2013.01); *Y10T 137/7759* (2015.04)

(58) Field of Classification Search
CPC ..... G05D 7/0635; G01F 15/06; G01F 15/003; G01F 15/005; Y10T 137/7759

USPC ........................................................ 137/486
See application file for complete search history.

(56) References Cited

U.S. PATENT DOCUMENTS

| | | |
|---|---|---|
| 3,973,657 A | 8/1976 | Darling |
| 4,228,791 A | 10/1980 | Hirai et al. |
| 4,469,801 A | 9/1984 | Hirai et al. |
| 4,552,669 A | 11/1985 | Sekellick |
| 4,565,747 A | 1/1986 | Nakae et al. |
| 4,645,176 A | 2/1987 | Ogawa et al. |
| 4,666,126 A | 5/1987 | Tujimura et al. |
| 4,695,034 A | 9/1987 | Shimizu et al. |
| 4,750,524 A | 6/1988 | Sekoguchi et al. |
| 4,751,099 A | 6/1988 | Niino et al. |
| 4,763,874 A | 8/1988 | Ogawa |
| 4,772,304 A | 9/1988 | Nakae et al. |
| 4,804,164 A | 2/1989 | Nakazawa et al. |
| 4,900,526 A | 2/1990 | Matsuda et al. |
| 4,940,851 A | 7/1990 | Oyobe et al. |
| 4,947,889 A | 8/1990 | Ishikawa et al. |
| 4,977,916 A | 12/1990 | Ohmi et al. |

(Continued)

OTHER PUBLICATIONS

Guidelines on cell phone and PDA security.

*Primary Examiner* — Kevin Lee
*Assistant Examiner* — P. Macade Nichols
(74) *Attorney, Agent, or Firm* — Kumar K. Maheshwari; Mahesh Law Group

(57) ABSTRACT

A device that includes a flow controller system that comprises one or more sensors, a flow measurement sensor that comprises one or more sensors. The flow measurement sensor is configured to generate a signal based on determine the difference between the flow as measured by the flow controller system and the flow measurement system in real time.

15 Claims, 7 Drawing Sheets

(56) References Cited

U.S. PATENT DOCUMENTS

| | | | |
|---|---|---|---|
| 5,045,356 A | 9/1991 | Uemura et al. | |
| 5,048,332 A | 9/1991 | Ishikawa et al. | |
| 5,114,447 A | 5/1992 | Davis | |
| 5,122,312 A | 6/1992 | Tomalesky | |
| 5,129,418 A * | 7/1992 | Shimomura | G05D 7/0635 |
| | | | 137/486 |
| 5,141,021 A | 8/1992 | Shimomura et al. | |
| 5,145,147 A | 9/1992 | Nakazawa et al. | |
| 5,160,542 A | 11/1992 | Mihira et al. | |
| 5,319,134 A | 6/1994 | Hirai | |
| 5,351,936 A | 10/1994 | Tanikawa et al. | |
| 5,377,616 A | 1/1995 | Mihira et al. | |
| 5,398,725 A | 3/1995 | Nakazawa et al. | |
| 5,429,998 A | 7/1995 | Someno et al. | |
| 5,516,075 A | 5/1996 | Itoi et al. | |
| 5,520,001 A | 5/1996 | Miyamoto et al. | |
| 5,606,994 A | 3/1997 | Tanikawa et al. | |
| 5,630,878 A | 5/1997 | Miyamoto et al. | |
| 5,634,627 A | 6/1997 | Daido et al. | |
| 5,669,408 A | 9/1997 | Nishino et al. | |
| 5,669,596 A | 10/1997 | Yoshikawa et al. | |
| 5,678,803 A | 10/1997 | Shinohara et al. | |
| 5,769,110 A | 6/1998 | Ohmi et al. | |
| 5,771,919 A | 6/1998 | Itoi et al. | |
| 5,778,968 A | 7/1998 | Hendrickson et al. | |
| 5,791,369 A | 8/1998 | Nishino et al. | |
| 5,810,928 A | 9/1998 | Harada et al. | |
| 5,816,285 A | 10/1998 | Ohmi et al. | |
| 5,850,853 A | 12/1998 | Ohmi et al. | |
| 5,865,205 A | 2/1999 | Wilmer | |
| 5,881,997 A | 3/1999 | Ogawa et al. | |
| 5,901,984 A | 5/1999 | Nishikawa | |
| 5,904,381 A | 5/1999 | Ohmi et al. | |
| 5,913,504 A | 6/1999 | Nishimura et al. | |
| 5,917,066 A | 6/1999 | Eisenmann et al. | |
| 5,937,263 A | 8/1999 | Eisenmann et al. | |
| 5,950,675 A | 9/1999 | Minami et al. | |
| 5,967,489 A | 10/1999 | Nakazawa et al. | |
| 5,975,112 A | 11/1999 | Ohmi et al. | |
| 5,979,944 A | 11/1999 | Yokoyama et al. | |
| 5,983,933 A | 11/1999 | Ohmi et al. | |
| 5,988,210 A | 11/1999 | Komiya et al. | |
| 5,988,217 A | 11/1999 | Ohmi et al. | |
| 6,006,701 A | 12/1999 | Nagano | |
| 6,007,307 A | 12/1999 | Sonoda | |
| 6,012,474 A | 1/2000 | Takamoto et al. | |
| 6,039,360 A | 3/2000 | Ohmi et al. | |
| 6,080,219 A | 6/2000 | Jha et al. | |
| 6,093,662 A | 7/2000 | Ohmi et al. | |
| 6,102,640 A | 8/2000 | Yokoyama et al. | |
| 6,116,092 A | 9/2000 | Ohmi et al. | |
| 6,116,282 A | 9/2000 | Yamaji et al. | |
| 6,116,283 A | 9/2000 | Yamaji et al. | |
| 6,119,710 A | 9/2000 | Brown | |
| 6,135,155 A | 10/2000 | Ohmi et al. | |
| 6,149,718 A | 11/2000 | Cowan et al. | |
| 6,152,162 A | 11/2000 | Balazy et al. | |
| 6,152,168 A | 11/2000 | Ohmi et al. | |
| 6,158,679 A | 12/2000 | Ohmi et al. | |
| 6,161,875 A | 12/2000 | Yamaji et al. | |
| 6,178,995 B1 | 1/2001 | Ohmi et al. | |
| 6,180,067 B1 | 1/2001 | Ohmi et al. | |
| 6,193,212 B1 | 2/2001 | Ohmi et al. | |
| 6,199,260 B1 | 3/2001 | Ohmi et al. | |
| 6,210,482 B1 | 4/2001 | Kitayama et al. | |
| 6,216,726 B1 | 4/2001 | Brown et al. | |
| 6,237,635 B1 | 5/2001 | Nambu | |
| 6,244,562 B1 | 6/2001 | Ejiri | |
| 6,244,563 B1 | 6/2001 | Ejiri | |
| 6,247,495 B1 | 6/2001 | Yamamoto et al. | |
| 6,257,270 B1 | 7/2001 | Ohmi et al. | |
| 6,274,098 B1 | 8/2001 | Tanabe et al. | |
| 6,289,923 B1 | 9/2001 | Ohmi et al. | |
| 6,302,130 B1 | 10/2001 | Ohmi et al. | |
| 6,314,992 B1 | 11/2001 | Ohmi et al. | |
| 6,334,962 B1 | 1/2002 | Minami et al. | |
| 6,360,762 B2 | 3/2002 | Kitayama et al. | |
| 6,361,081 B1 | 3/2002 | Yokoyama et al. | |
| 6,378,192 B1 | 4/2002 | Ohmi et al. | |
| 6,379,035 B1 | 4/2002 | Kubo et al. | |
| 6,382,238 B2 | 5/2002 | Ishii et al. | |
| 6,387,158 B2 | 5/2002 | Ikeda et al. | |
| 6,394,415 B1 | 5/2002 | Ohmi et al. | |
| 6,422,256 B1 | 7/2002 | Balazy et al. | |
| 6,422,264 B2 | 7/2002 | Ohmi et al. | |
| 6,441,350 B1 | 8/2002 | Stoddard et al. | |
| 6,450,190 B2 | 9/2002 | Ohmi et al. | |
| 6,505,814 B1 | 1/2003 | Satou et al. | |
| 6,517,362 B2 | 2/2003 | Hirai | |
| 6,539,968 B1 | 4/2003 | White et al. | |
| 6,561,218 B2 | 5/2003 | Mudd | |
| 6,563,072 B1 | 5/2003 | Ohmi et al. | |
| 6,604,493 B1 | 8/2003 | Toki | |
| 6,606,912 B2 | 8/2003 | Ohmi et al. | |
| 6,615,871 B2 | 9/2003 | Ohmi et al. | |
| 6,618,922 B2 | 9/2003 | Ohmi et al. | |
| 6,704,696 B1 | 3/2004 | Kuramochi et al. | |
| 6,719,947 B1 | 4/2004 | Jha et al. | |
| 6,733,732 B2 | 5/2004 | Ohmi et al. | |
| 6,752,376 B1 | 6/2004 | Satou et al. | |
| 6,752,387 B1 | 6/2004 | Nishizato et al. | |
| 6,763,581 B2 | 7/2004 | Hirai | |
| 6,779,774 B2 | 8/2004 | Itoi | |
| 6,786,471 B2 | 9/2004 | Nakata et al. | |
| 6,802,333 B2 | 10/2004 | Balazy et al. | |
| 6,820,632 B2 | 11/2004 | Ohmi et al. | |
| 6,837,112 B2 | 1/2005 | Ferran et al. | |
| 6,848,470 B2 | 2/2005 | Ohmi et al. | |
| 6,868,867 B2 | 3/2005 | Yamaji et al. | |
| 6,871,803 B1 | 3/2005 | Ohmi et al. | |
| 6,933,233 B2 | 8/2005 | Yonebayashi et al. | |
| 6,938,489 B2 | 9/2005 | Esashi et al. | |
| 6,964,279 B2 | 11/2005 | Ohmi et al. | |
| 7,059,363 B2 | 6/2006 | Sugiyama et al. | |
| 7,080,658 B2 | 7/2006 | Ohmi et al. | |
| 7,085,628 B2 | 8/2006 | Ohmi et al. | |
| 7,087,158 B2 | 8/2006 | Miyamoto et al. | |
| 7,087,443 B2 | 8/2006 | Hornberg et al. | |
| 7,103,990 B2 | 9/2006 | Ohmi et al. | |
| 7,111,467 B2 | 9/2006 | Apparao et al. | |
| 7,112,234 B2 | 9/2006 | Jha et al. | |
| 7,115,186 B2 | 10/2006 | Miyamoto et al. | |
| 7,127,901 B2 | 10/2006 | Dresens et al. | |
| 7,150,287 B2 | 12/2006 | Kita et al. | |
| 7,150,444 B2 | 12/2006 | Ohmi et al. | |
| 7,175,157 B2 | 2/2007 | Tanikawa et al. | |
| 7,185,543 B2 | 3/2007 | Sekoguchi | |
| 7,219,533 B2 | 5/2007 | Ohmi et al. | |
| 7,234,310 B2 | 6/2007 | Flynn et al. | |
| 7,258,845 B2 | 8/2007 | Ohmi et al. | |
| 7,278,437 B2 | 10/2007 | Ohmi et al. | |
| 7,289,863 B2 | 10/2007 | Arruda et al. | |
| 7,361,300 B2 | 4/2008 | Kelly et al. | |
| 7,363,810 B2 | 4/2008 | Ikeda et al. | |
| 7,367,241 B2 | 5/2008 | Ohmi et al. | |
| 7,368,092 B2 | 5/2008 | Ohmi et al. | |
| 7,377,152 B2 | 5/2008 | Brekelmans et al. | |
| 7,416,165 B2 | 8/2008 | Ohmi et al. | |
| 7,431,045 B2 | 10/2008 | Mudd et al. | |
| 7,472,887 B2 | 1/2009 | Ohmi et al. | |
| 7,478,540 B2 | 1/2009 | Flynn et al. | |
| 7,490,483 B2 | 2/2009 | Boiarski et al. | |
| 7,497,482 B2 | 3/2009 | Sugiyama et al. | |
| 7,552,617 B2 | 6/2009 | Danilchik | |
| 7,553,459 B2 | 6/2009 | Ohmi et al. | |
| 7,590,498 B1 | 9/2009 | Chung et al. | |
| 7,594,517 B2 | 9/2009 | Kannan et al. | |
| 7,636,640 B2 | 12/2009 | Wang et al. | |
| 7,654,137 B2 | 2/2010 | Hirata et al. | |
| 7,669,455 B2 | 3/2010 | Ohmi et al. | |
| 7,677,528 B2 | 3/2010 | Shinohara et al. | |
| 7,680,399 B2 | 3/2010 | Buchanan et al. | |
| 7,695,984 B1 | 4/2010 | Monkowski et al. | |
| 7,699,573 B2 | 4/2010 | Blattner et al. | |

(56) References Cited

U.S. PATENT DOCUMENTS

| | | |
|---|---|---|
| 7,748,268 B2 | 7/2010 | Lull et al. |
| 7,757,541 B1 | 7/2010 | Monkowski et al. |
| 7,788,942 B2 | 9/2010 | Dresens et al. |
| 7,798,167 B2 | 9/2010 | Ohmi et al. |
| 7,802,482 B2 | 9/2010 | Ikeda |
| 7,814,797 B2 | 10/2010 | Shikata et al. |
| 7,815,872 B2 | 10/2010 | Nariai et al. |
| 7,823,436 B2 | 11/2010 | Monkowski et al. |
| 7,833,329 B2 | 11/2010 | Mahon, III et al. |
| 7,835,791 B2 | 11/2010 | Sunagawa et al. |
| 7,841,628 B2 | 11/2010 | Tokuda et al. |
| 7,849,869 B2 | 12/2010 | Ohmi et al. |
| 7,871,830 B2 | 1/2011 | Johal et al. |
| 7,873,052 B2 | 1/2011 | Chung et al. |
| 7,874,208 B2 | 1/2011 | Redemann et al. |
| 7,881,829 B2 | 2/2011 | Yoneda et al. |
| 7,890,194 B2 | 2/2011 | Pannese |
| 7,896,030 B2 | 3/2011 | Shinohara et al. |
| 7,905,139 B2 | 3/2011 | Lull |
| 7,926,509 B2 | 4/2011 | Ohmi et al. |
| 7,937,232 B1 | 5/2011 | Chow et al. |
| 7,940,395 B2 | 5/2011 | Monkowski et al. |
| 7,941,284 B1 | 5/2011 | Glaudel |
| 7,945,414 B2 | 5/2011 | Nagase et al. |
| 7,962,216 B2 | 6/2011 | Sunagawa et al. |
| 7,988,130 B2 | 8/2011 | Ohmi et al. |
| 7,991,510 B2 | 8/2011 | Duan et al. |
| 8,000,791 B2 | 8/2011 | Sunagawa et al. |
| 8,010,195 B2 | 8/2011 | Sunagawa et al. |
| 8,010,199 B2 | 8/2011 | Sunagawa et al. |
| 8,010,303 B2 | 8/2011 | Wang et al. |
| 8,019,481 B2 | 9/2011 | Yamaguchi et al. |
| 8,020,574 B2 | 9/2011 | Ohmi et al. |
| 8,027,729 B2 | 9/2011 | Sunagawa et al. |
| 8,042,573 B2 | 10/2011 | Tokuda et al. |
| 8,047,225 B2 | 11/2011 | Ohmi et al. |
| 8,047,510 B2 | 11/2011 | Hirata et al. |
| 8,056,579 B2 | 11/2011 | Takahashi et al. |
| 8,068,999 B2 | 11/2011 | Wang et al. |
| 8,091,381 B2 | 1/2012 | Boiarski et al. |
| 8,097,071 B2 | 1/2012 | Burgess et al. |
| 8,102,844 B1 | 1/2012 | Nelson et al. |
| 8,104,323 B2 | 1/2012 | Yasuda |
| 8,112,171 B2 | 2/2012 | Krupyshev |
| 8,118,054 B2 | 2/2012 | Glaudel et al. |
| 8,141,430 B2 | 3/2012 | Fortner et al. |
| 8,162,286 B2 | 4/2012 | Sawada et al. |
| 8,181,932 B2 | 5/2012 | Matsumoto et al. |
| 8,195,418 B2 | 6/2012 | Borenstein |
| 8,196,609 B2 | 6/2012 | Oya et al. |
| 8,197,133 B2 | 6/2012 | Schultz et al. |
| 8,210,022 B2 | 7/2012 | Moriya et al. |
| 8,210,493 B2 | 7/2012 | Miyagawa et al. |
| 8,219,329 B2 | 7/2012 | Ebi et al. |
| 8,220,495 B2 | 7/2012 | Nakata et al. |
| 8,237,928 B2 | 8/2012 | Monkowski et al. |
| 8,240,324 B2 | 8/2012 | Monkowski et al. |
| 8,246,087 B1 | 8/2012 | Yamaji et al. |
| 8,256,744 B2 | 9/2012 | Tanikawa et al. |
| 8,261,562 B2 | 9/2012 | Dresens et al. |
| 8,265,795 B2 | 9/2012 | Takahashi et al. |
| 8,265,888 B2 | 9/2012 | Chung et al. |
| 8,267,634 B2 | 9/2012 | Bufano et al. |
| 8,271,210 B2 | 9/2012 | Chung et al. |
| 8,271,211 B2 | 9/2012 | Chung et al. |
| 8,280,235 B2 | 10/2012 | Nishikawa et al. |
| 8,281,816 B2 | 10/2012 | Nakata et al. |
| 8,327,876 B2 | 12/2012 | Koyomogi |
| 8,328,495 B2 | 12/2012 | Bufano et al. |
| 8,340,749 B2 | 12/2012 | Sugimachi et al. |
| 8,356,623 B2 | 1/2013 | Isobe et al. |
| 8,381,755 B2 | 2/2013 | Moriya et al. |
| 8,393,197 B2 | 3/2013 | Monkowski et al. |
| 8,408,044 B2 | 4/2013 | Danilchik |
| 8,413,452 B2 | 4/2013 | Morris et al. |
| 8,418,714 B2 | 4/2013 | Ohmi et al. |
| 8,425,172 B2 | 4/2013 | Blattner et al. |
| 8,429,979 B2 | 4/2013 | Kuwahara et al. |
| 8,434,507 B2 | 5/2013 | Iida et al. |
| 8,434,522 B2 | 5/2013 | Okase et al. |
| 8,443,649 B2 | 5/2013 | Yasuda et al. |
| 8,443,830 B2 | 5/2013 | Tanikawa et al. |
| 8,459,290 B2 | 6/2013 | Minami et al. |
| 8,459,291 B2 | 6/2013 | Minami et al. |
| 8,469,046 B2 | 6/2013 | Minami et al. |
| 8,496,022 B2 | 7/2013 | Sugiyama et al. |
| 8,504,318 B2 | 8/2013 | Mendelson et al. |
| 8,509,938 B2 | 8/2013 | Krupyshev |
| 8,511,169 B2 | 8/2013 | Fortner et al. |
| 8,544,828 B2 | 10/2013 | Miyamoto et al. |
| 8,555,920 B2 | 10/2013 | Hirata et al. |
| 8,561,966 B2 | 10/2013 | Dohi et al. |
| 8,587,180 B2 | 11/2013 | Sugita et al. |
| 8,589,107 B2 | 11/2013 | Borenstein |
| 8,601,976 B2 | 12/2013 | Nishino et al. |
| 8,606,412 B2 | 12/2013 | Nagase et al. |
| 8,646,307 B2 | 2/2014 | Yasuda et al. |
| 8,648,604 B2 | 2/2014 | Brucker |
| 8,661,919 B2 | 3/2014 | Oba et al. |
| 8,667,830 B2 | 3/2014 | Monkowski et al. |
| 8,673,065 B2 | 3/2014 | Burgess et al. |
| 8,714,188 B2 | 5/2014 | Ohmi et al. |
| 8,718,984 B2 | 5/2014 | Sekoguchi |
| 8,724,974 B2 | 5/2014 | Ohmi et al. |
| 8,726,923 B2 | 5/2014 | Daido et al. |
| 8,744,784 B2 | 6/2014 | Yasuda et al. |
| 8,746,057 B2 | 6/2014 | Yasuda et al. |
| 8,755,679 B2 | 6/2014 | Nishikawa et al. |
| 8,757,197 B2 | 6/2014 | Hirata et al. |
| 8,763,928 B2 | 7/2014 | Nishikawa et al. |
| 8,789,556 B2 | 7/2014 | Yasuda et al. |
| 8,800,589 B2 | 8/2014 | Minami et al. |
| 8,820,360 B2 | 9/2014 | Oya et al. |
| 8,833,730 B2 | 9/2014 | Sawada et al. |
| 8,844,901 B2 | 9/2014 | Hayashi |
| 8,751,180 B2 | 10/2014 | Lull et al. |
| 8,851,105 B2 | 10/2014 | Kashima et al. |
| 8,857,456 B2 | 10/2014 | Monkowski et al. |
| 8,869,552 B2 | 10/2014 | Dresens et al. |
| 8,887,549 B2 | 11/2014 | Mendelson et al. |
| 8,910,656 B2 | 12/2014 | Yasuda |
| 8,918,203 B2 | 12/2014 | Gilchrist et al. |
| 8,931,506 B2 | 1/2015 | Nagata et al. |
| 8,967,200 B2 | 3/2015 | Hayashi |
| 8,979,137 B2 | 3/2015 | Kimura et al. |
| 9,010,369 B2 | 4/2015 | Ohmi et al. |
| 8,965,714 B2 | 5/2015 | Yamaguchi et al. |
| 9,038,663 B2 | 5/2015 | Dohi et al. |
| 9,057,636 B2 | 6/2015 | Nagai |
| 9,075,414 B2 | 7/2015 | Takijiri |
| 9,081,388 B2 | 7/2015 | Tanaka et al. |
| 9,091,380 B2 | 7/2015 | Hayashi et al. |
| 9,098,082 B2 | 8/2015 | Sugiyama et al. |
| 9,103,366 B2 | 8/2015 | Amikura et al. |
| 9,109,736 B2 | 8/2015 | Yada et al. |
| 9,116,526 B2 | 8/2015 | Hashimoto et al. |
| 9,127,796 B2 | 9/2015 | Hirose et al. |
| 9,133,951 B2 | 9/2015 | Ohmi et al. |
| 9,149,750 B2 | 10/2015 | Steele et al. |
| 9,163,743 B2 | 10/2015 | Hidaka et al. |
| 9,163,748 B2 | 10/2015 | Hirose et al. |
| 9,163,969 B2 | 10/2015 | Sawada et al. |
| 9,169,558 B2 | 10/2015 | Hirose et al. |
| 9,169,940 B2 | 10/2015 | Yogo et al. |
| 9,188,990 B2 | 11/2015 | Yasuda |
| 9,212,755 B2 | 12/2015 | Kuriki et al. |
| 9,223,318 B2 | 12/2015 | Takeuchi et al. |
| 9,224,628 B2 | 12/2015 | Bufano et al. |
| 9,230,841 B2 | 1/2016 | Gilchrist et al. |
| 9,233,347 B2 | 1/2016 | Nagase et al. |
| 9,261,884 B2 | 2/2016 | Sawada et al. |
| 9,266,039 B2 | 2/2016 | Eacobacci, Jr. et al. |
| 9,274,091 B2 | 3/2016 | Danilchik |
| 9,285,079 B2 | 3/2016 | Yamaguchi et al. |

(56) References Cited

U.S. PATENT DOCUMENTS

| | | |
|---|---|---|
| 9,304,030 B2 | 4/2016 | Tanaka et al. |
| 9,308,584 B2 | 4/2016 | Burgess et al. |
| 9,328,826 B2 | 5/2016 | Hayashi |
| 9,334,859 B2 | 5/2016 | Dresens et al. |
| 9,454,158 B2 * | 9/2016 | Somani ................ G01F 15/003 |
| 2002/0046612 A1 | 4/2002 | Mudd |
| 2015/0241264 A1 | 8/2015 | Nagai |

* cited by examiner ns and Methods

RELATED APPLICATIONS

This application is a continuation of U.S Utility application Ser. No. 14/210,113 filed on Mar. 13, 2014 entitled "REAL TIME DIAGNOSTICS FOR FLOW CONTROLLER SYSTEMS AND METHODS", which is incorporated herein by reference in its entirety. This application also claims benefit from U.S. Provisional Patent Application No. 61/792,493, filed Mar. 15, 2013, entitled "REAL TIME DIAGNOSTICS FOR FLOW CONTROLLER SYSTEMS AND METHODS", which is incorporated herein by reference in its entirety.

BACKGROUND

The present disclosure relates to the field of flow controllers. The present disclosure relates more specifically to a mass flow controller (MFC) systems and methods for controlling the MFC to control and deliver gases, fluids or a combination thereof.

SUMMARY

Various embodiments include a flow controller system that comprises one or more sensors, a flow measurement sensor that comprises one or more sensors. The flow measurement sensor is configured to generate a signal based on determine the difference between the flow as measured by the flow controller system and the flow measurement system in real time.

Alternative embodiments relate to other features and combinations of features as may be generally recited in the claims. Embodiments described below allow parallel or serial processing of each method and/or component.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, embodiments of the systems and methods described herein are directed to a real time diagnostic system for a mass flow controller. Implementations are directed to flow controllers that provide real-time measurements of actual flow while delivering and/or controlling the flow of fluids or gases through the system. Implementations are directed to techniques that would allow a device to deliver and control the gas and/or fluid, while simultaneously measuring the amount of flow. Embodiments provide real time monitoring and diagnostic capabilities while the device controls and delivers fluid.

A flow controller may use the pressure in the pipe, temperature of the fluid and either a flow through an orifice or through a known volume to control the flow of a desired amount of fluid by controlling an outlet valve. Measuring the flow includes, but is not limited to, a pressure sensor controlled MFC that relies on the change in pressure across an orifice to deliver gas or other fluids, a device measuring pressure, volume and temperature will be able to also deliver such gas and/or other fluids. Embodiments provide a measuring technique to the above mentioned technique that will measure the amount of fluid flowing through the system and provide a further verification to the above-mentioned implementations. An independent sensing technique to determine the flow rate through a thermal sensor and/or a flow over a MEMS sensor or a velocity measurement sensor can be used to determine flow through a pipe. Further alarms may be generated based on the input received from independent sensors.

Figure 1:
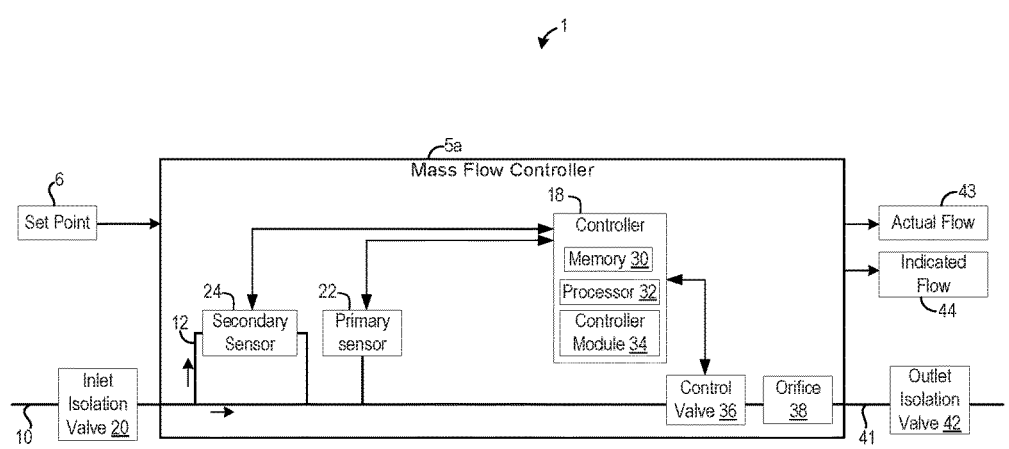
FIG. 1 is a schematic diagram of a flow delivery system, according to an exemplary embodiment.

Referring to FIG. 1, FIG. 1 is a schematic diagram of a flow system 1, according to an exemplary embodiment. Flow system 1 includes a mass flow controller 5a, a set point 6, a fluid path 10, an inlet isolation valve 20, outlet isolation valve 42, actual flow indicator signal 43, and an indicated flow indicator signal 44.

The fluid delivery path 10 is a hollow tube, pipe or similar channel that may be composed of a material that are non-reactive to the fluid or gas being delivered from inlet isolation valve 20 to outlet isolation valve 42. The materials include, but are not limited to, polyurethane, high purity stainless steel, Inconel and haste alloy. The materials may be non-reactive to various liquids and/or gasses. Materials, such as but not limited to, haste alloy, Inconel, and/or passivated stainless steel may be used for fluid delivery path 10. The fluid delivery path 10 provides a hollow volume that is used for the transportation of gasses and/or liquids in one or more directions towards outlet isolation valve 42. The volume in fluid delivery path 10 can be accurately measured to NIST or other standards. A fluid may be accurately delivered by using the results of the volume measurement in conjunction with pressure and temperature measurements in the fluid delivery path 10 and then the fluid may be precisely controlled by the fluid outlet valve.

Inlet isolation valve 20 controls the flow of the fluid or gas that is passed through the fluid delivery path 10. Inlet isolation valve 20 may be a pneumatic valve, high precision piezo type control valve, or solenoid type of valve. Inlet isolation valve 20 may be configured to be normally open or normally closed. The mass flow controller 5a may be configured to control the inlet isolation valve 20, in one embodiment. In one embodiment, the mass flow controller 5a may open or close the inlet isolation valve 20 based on a sensor reading from within the mass flow controller.

The set point 6 is an input value that is received by the mass flow controller 5a. The value that is received may represent the desired flow rate that the mass flow controller 5a should output. The mass flow controller 5a may control the valves that are located within the mass flow controller 5a to output fluids and/or gases to deliver the same flow rate as the received set point 6 flow rate as accurately as possible by the system.

The mass flow controller 5a is configured to receive as input a set point 6 and gas and/or fluid enters into the mass flow controller 5a through a fluid delivery path 10. The mass flow controller 5a has various outputs, such as but not limited to, an outlet isolation valve 42, an actual flow signal 43, and an indicated flow signal 44. Gas and/or fluid may exit through an output flow path 41. The mass flow controller 5a is configured to set, measure and control the flow of a particular gas or liquid.

The mass flow controller 5a includes a primary sensor 22, a secondary sensor 24, a controller 18, a control valve 36 and an orifice 38. The primary sensor 22 may be configured to determine the incoming pressure of the fluid that is flowing through the fluid delivery path 10. Pressure sensing technologies deployed could be, but not limited to, diaphragm type, thermistor, resistor, or reactant type. In another embodiment, the primary sensor 22 may be a temperature sensor that is used to measure the temperature of the fluid and/or the block of the fluid delivery path 10. In yet another embodiment, the primary sensor 22 may be a combination of a pressure and temperature sensors. The primary sensor 22 may generate a signal that allows the controller 18 to determine the flow rate of control valve 36.

The controller 18 of the mass flow controller 5a may receive analog electrical signals from the primary sensor 22. The received signal current or voltage may change based on the pressure and/or temperature of the gas and/or liquid flowing through the fluid delivery path 10. The controller 18 may include a memory 30, processor 32 and controller module 34. The memory 30 is configured to store the received set point 6 and store the sensor readings from the primary sensor 22 and secondary sensor 24. The memory 30 may store instructions that may be executed by the processor 32. The processor 32 may communicate with the memory 30 and the controller module 34. The controller module 34 may communicate with the control valve 36. The communications between the control valve 36 and the controller module 34 may include adjusting the flow rate of the liquid or gas flowing through the control valve 36. The adjustments may include opening and closing the valve to assure the actual flow 43 and the set point 6.

In other embodiments, the mass flow controller 5a may include a secondary sensor 24. The secondary sensor 24 may include a thermal/temperature-based gas measurement sensor, a velocity measurement sensor, MEMS sensor or other techniques, which are independent of the use of the primary sensor 22. In some embodiments, the secondary sensor 22 generates a signal that generates an alarm. The alarm may be user programmable such that when the secondary sensor 24 measurements deviate by a certain percentage (e.g., less than or more than 1%, 2%, 3%, 4%, 5%, 10%, 15%, 20%, etc.) from previously measured values, then the alarm is triggered and presented to the user of the MFC. As shown in FIG. 1, the secondary sensor may receive a flow of fluid or gas from a bypass 12 that shunts a portion of the fluid flow from the fluid flow path to the secondary sensor 24. The secondary sensor 24 may return the contents from bypass 12 back to the fluid flow path 10 after taking a measurement using the secondary sensor 24.

In an alternative embodiment, the controller 18 may receive signals from the primary sensor 22 and secondary sensor 24 and adjust the control valve 36 based at least partially on the sensor readings of both the primary sensor 22 and the secondary sensor 24. In some embodiments, the primary sensor 22 may detect the flow and the secondary sensor 24 may also detect the flow passing through flow 10. In some embodiments, when the flow measured by both sensors differs, the MFC 5a may determine which one or both of the sensors may be malfunctioning. In some embodiments, the sensor that may be malfunctioning may be calibrated to set the sensor value to be equal to the flow received from the other sensor.

The orifice 38 may be optional, in one embodiment, and is typically used to ensure the fluid delivery is in the sonic regime. The fluid will be insensitive to up-stream pressure fluctuations by being in the sonic regime.

Figure 2A:
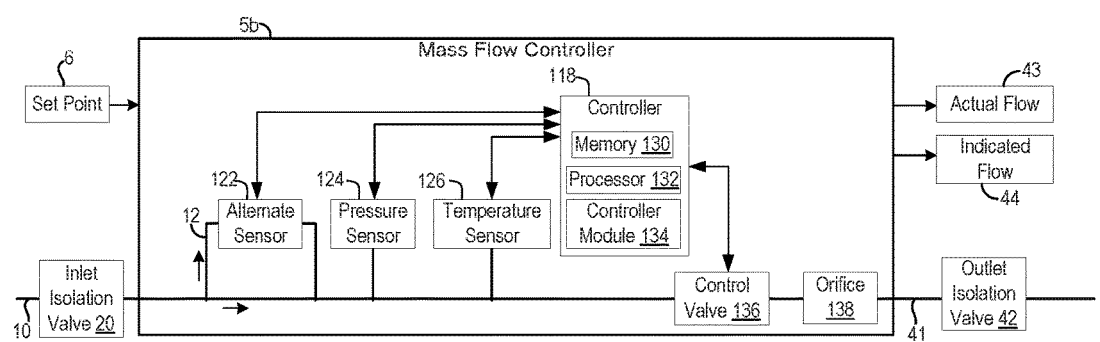
FIG. 2a is a schematic diagram of a flow delivery system, according to an exemplary embodiment.

Referring to FIG. 2a, FIG. 2a illustrates as schematic diagram of a mass flow controller 5b. The inputs and the outputs of the mass flow controller 5b may be similar to the inputs and outputs of the mass flow controller 5a. However, the mass flow controller 5b comprises three or more sensors that aid the controller 118 to manage the flow through the fluid delivery path 10.

The mass flow controller 5b includes an alternate sensor 122, a pressure sensor 124, a temperature sensor 126, controller 118, control valve 136, and orifice 138. Pressure sensor 124 measures the incoming pressure of the fluid at any given instance. Pressure sensing technologies deployed could be, but not limited to, diaphragm, thermistor or resistor type, or reactant type. Temperature sensor 126 measures the temperature of the fluid and/or the block of the fluid delivery path 10. Commercially available sensors such as diaphragm type, thermistor or resistor type can be used in the system.

The orifice 138 is optional in the setup and is typically used to ensure the fluid delivery is in the sonic regime. Being in the sonic regime allows for the fluid to be insensitive to up-stream pressure fluctuations.

Alternate sensor 22 is using a thermal-based gas measurement sensor, a velocity measurement sensor, MEMS sensor or other techniques which are independent of the use of fluid delivery path 10, pressure sensor 24, temperature sensor 26. The alternate sensor 22 generates a signal that generates an alarm, which may be transmitted to the user by indicated flow 44 or by an independent designated alarm signal. The alarm is user programmable such that when the alternate sensor 22 measurements deviate by a certain percentage (e.g., less than or more than 1%, 2%, 3%, 4%, 5%, 10%, 15%, 20%, etc.), then the alarm is triggered. In some embodiments, the alternate sensor 22 can be a Coriolis principle sensor or sensors and/or momentum measurement sensor could be an alternate sensor 22 as well.

Control system 118 takes the input from 24, 26 and has the known measured volume 10 in its algorithm. Using the values from the pressure sensor, the temperature sensor and the known volume 10, control system 28 can then send an output signal to control valve 28 to adjust itself to a required control state. Such control state is provided to control system 28 from outside the mass flow controller 5b as described below.

Control valve 136 is used to control the delivery of gas through the system to the desired/required set point/flow-rate. Control valve 136 could be a solenoid, piezoactuated or other such high precision control type valve. Control Valve 136 gets its input from control system 118, and is a function of the values of alternate sensor 122, pressure sensor 124, and temperature sensor 126.

Similar to inlet isolation valve 20, outlet isolation valve 42 acts as a final control step (on/off) between the mass flow controller 5b and the reaction chamber or the next step where the fluid is delivered. In one embodiment, the outlet isolation valve 42 may have the same construction as inlet isolation valve 20. In another embodiment, the inlet isolation valve 20 and the outlet isolation valve, outlet isolation valve 42 may be different type of values. In this embodiment having two different types of values allows a user to diagnose a problem with a value type verses another valve type.

Mass Flow controller 5b may comprise all or some of the elements mentioned above. The controller 118 calculates the position of the controller valve 136 based on the signals received from the alternate sensor 122, the pressure sensor 124, and the temperature sensor 126. The controller 118 attempts to maintain actual flow 43 to be equal to the set point 6. While controller 118 performing the above operations, alternate sensor 22, being an independent and self-contained measurement system, is configured to measure the flow through flow path 10 and provide the measured value to control system 118. Control system 118 has the ability to provide the value calculated from alternate sensor 122, relative to the calculated flow based on measuring the values from alternate sensor 122, pressure sensor 124, temperature sensor 126 and the position of valve 136. This value could be provided as an absolute flow value, or provided as a calculated relative error to set point, or relative error to expected flow. Mass flow controller 5b records various key parameters (e.g. actual flow, expected flow, temperature, etc.) over a user-settable period of time on memory 30. Such parameters are, but are not limited to set point 6, actual flow 43 from alternate sensor 22, expected flow calculated by 118 based on pressure sensor 24, temperature 26 and control valve 136 position and so on.

Figure 2B:
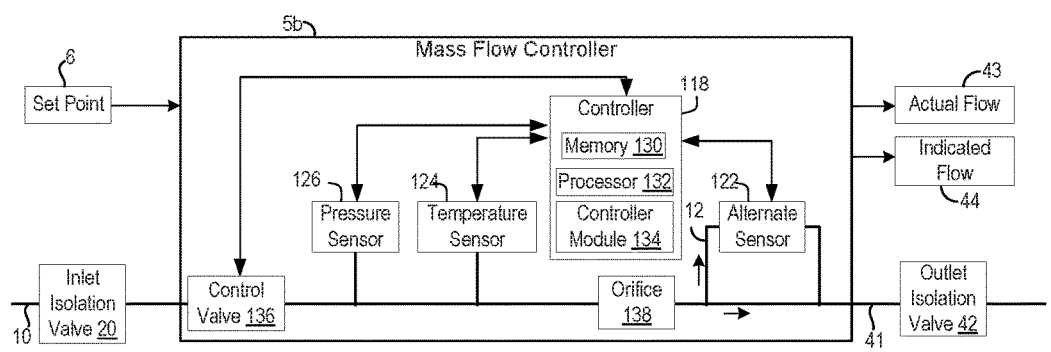
FIG. 2b is a schematic diagram of a flow delivery system, according to an exemplary embodiment.

Referring to FIG. 2b, FIG. 2b illustrates a flow system according to another embodiment. The system in FIG. 2b is similar to the systems in FIGS. 1 and 2a. However, in FIG. 2b the alternate sensor 122 is located within the fluid flow path after the orifice 138 and before the outlet isolation valve 42. As shown in FIG. 2b, the alternate sensor 122 may receive a flow of fluid or gas from a bypass 12 that shunts a portion of the fluid flow from the fluid flow path to the alternate sensor 122. The alternate sensor 122 may return the contents from bypass 12 back to the fluid flow path 10 after taking a measurement using the alternate sensor 122. The alternate sensor 122 generates a signal that represents the relative fluid flow through the bypass 12 to the controller 118. The controller 118 retrieves information stored in the memory 130 and generates an indicated flow 44. In some embodiments, the actual flow 43 and indicated flow 44 may be compared to generate an additional signal representing an alarm condition. The alarm signal is generated when the actual flow 43 and indicated flow 44 have a predetermined difference. In some embodiments, when the actual flow 43 and the indicated flow 44 differ by more than or less than 1, 2, 3, 4, 5, 10, 15, 20 percent an alarm is generated.

Figure 3:
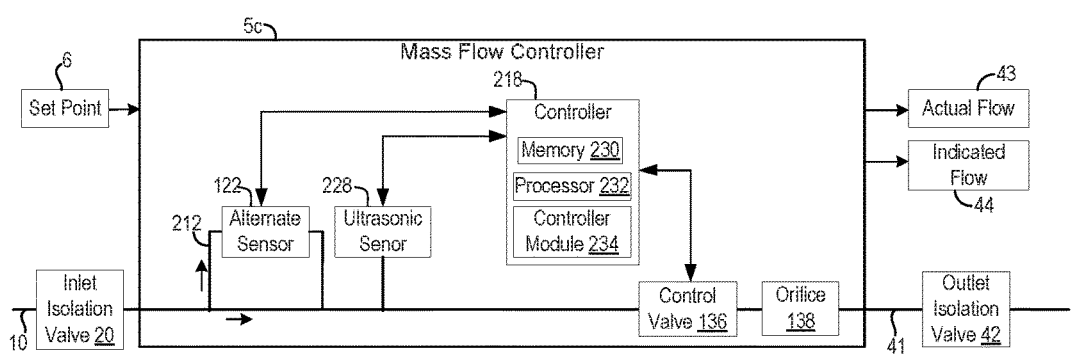
FIG. 3 is a schematic diagram of a flow delivery system, according to an exemplary embodiment.

FIG. 3 illustrates a flow system according to another embodiment. The system in FIG. 3 is similar to the systems in FIGS. 1 and 2a-b. FIG. 3 shows the mass flow controller 5c that includes an ultrasonic sensor 228. However, instead of using a pressure sensor 124 and/or a temperature sensor 126, an ultrasonic sensor 228 may replace both sensors. The controller 218 controls the control valve 236 by using the sensor readings from the ultrasonic sensor 228. In various embodiments, the ultrasonic sensor 228 may include providing the pressure and the temperature to the controller 218. In some embodiment, the mass flow controller 5c may include the alternate sensor 122 from FIG. 2. In another embodiment, the mass flow controller 5c may include the secondary sensor 24 from FIG. 1. In yet another implementation, the mass flow controller 5c may include both alternate sensor 122 and the secondary sensor 24.

Figure 4:
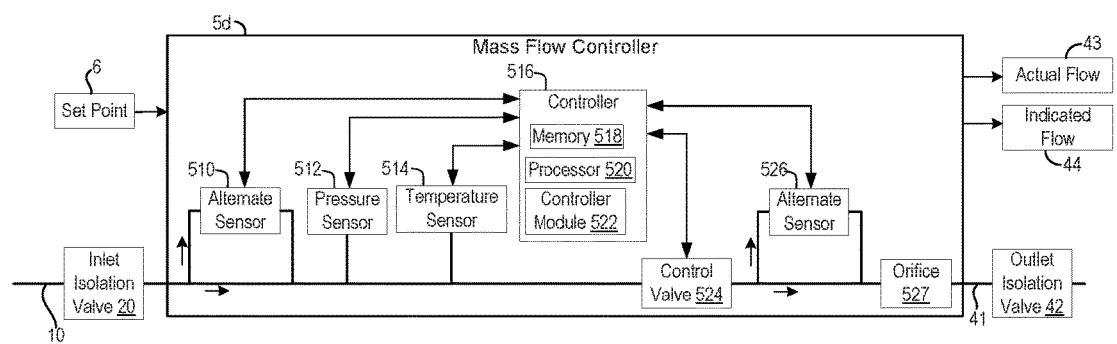
FIG. 4 is a schematic diagram of a flow delivery system, according to an exemplary embodiment.

FIG. 4 illustrates a mass flow controller 5d. In various embodiments, the mass flow controller 5d, receives as input the fluid delivery path 10, and set point 6. The mass flow controller 5d may output the output flow path 41. Mass flow controller 5d includes various components are similar to the components of mass flow controllers 5a-5c. In particular, mass flow controller 5d includes, an alternate sensor 510, pressure sensor 512, temperature sensor 514, a controller 516, an output isolation valve 524, an alternate sensor 526 and an orifice 527.

The alternate sensor 510, pressure sensor 512, and temperature sensor 514 may act in a similar manner as alternate sensor 122, pressure sensor 124 and temperature sensor 126 as discussed above with respect to FIG. 2. As shown in FIG. 4, the output isolation valve 524 may be connected to an alternate sensor 526 that includes a bypass shunt similar to alternative sensor 510. In other embodiments, the alternate sensor 526 may in an inline sensor similar to the pressure and/or temperature sensors. The alternate sensor 526 may generate a signal and provide it to the controller 516. The controller 516 may adjust the flow through the fluid delivery path 10 using the output isolation valve 524. In some embodiments, the controller 516 may adjust the actual flow 43 and/or indicated flow 44 based on the output of the alternate sensor 526.

The output from the alternative sensor 526 may be connected to the orifice 527 and the fluid delivery path 10 may be output as the output flow path 41 via valve 42 that is located outside the mass flow controller. In some embodiments, the valve 42 may be located within the mass flow controller 5a-d.

In other embodiments, the alternate sensor 510 or 526 may be a velocity sensor or a thermal sensor. In some embodiments, the alternate sensor 510 and 526 may be thermal sensors. In various implementations, a velocity sensor may replace the pressure sensor 512 and/or the temperature sensor 514. In other embodiments, the order of the sensors may be interchangeable. For example, the temperature sensor may be located first in the mass flow controller 5a-d. The temperature sensor may be followed by a pressure sensor, which is followed by an alternate sensor. In other embodiments, the alternate sensor may be located between the pressure and the temperature sensors.

Figure 5:
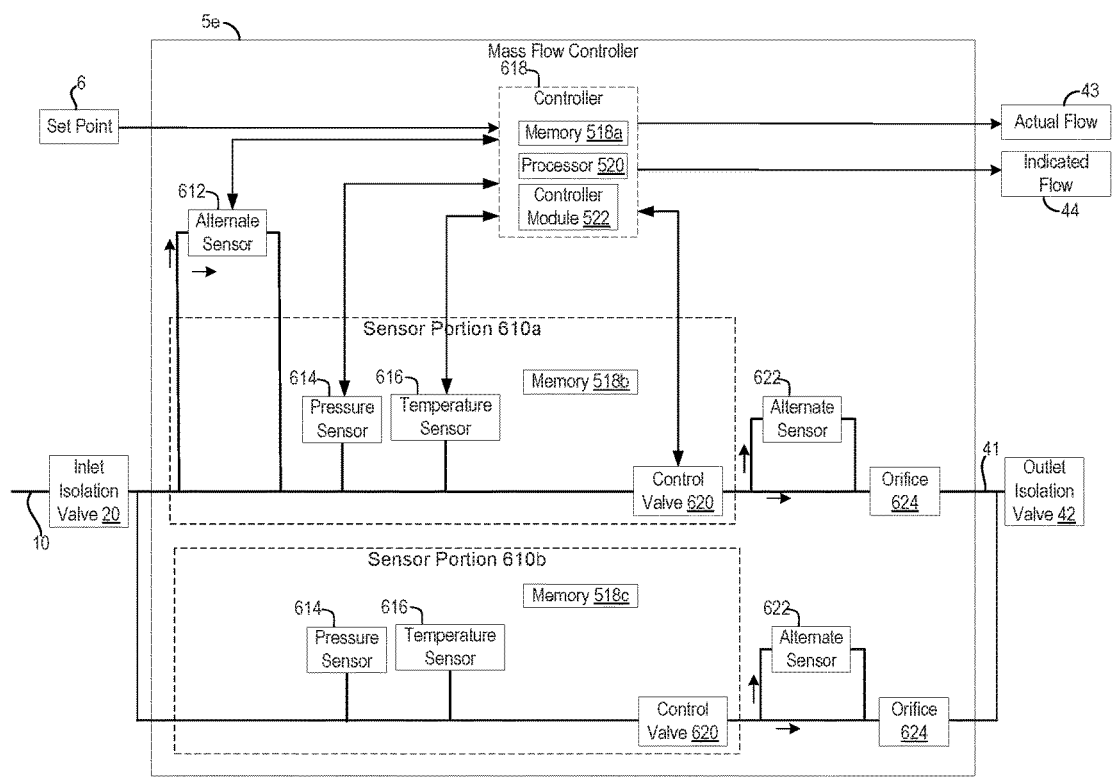
FIG. 5 is a schematic diagram of a flow delivery system, according to an exemplary embodiment.

FIG. 5 illustrates mass flow controller system according to another embodiment. Due to the fact that sensors or fluid control line may fail at a greater rate than the controller electronics, the controller may be removably attachable to the mass flow controller. As shown in FIG. 5 the mass flow controller 5e may comprise a sensor portion 610 and a controller portion 618. The controller portion 618 may receive various signals from the sensor portion 610a and the sensor portion 610a may receive various signals from the controller portion 618. In some embodiments, when the controller portion 618 determines that the sensor portion 610a is failing, the controller portion 618 may generate an alarm so that the sensor portion 610a may be swapped out or replaced with a new sensor portion. Each sensor portion includes a memory that is configured to store, for example, the volume that is between the input isolation value 20 and the output isolation valve 620. The controller 618 may access the memory in the sensor portion to determine the volume within the mass flow controller.

The new sensor portion may include a memory 518b or 518c that is configured to store the volume that is between the input isolation valve 20 and the output isolation valve 620. The controller 618 may access the memory 626 in the sensor portion to ascertain the volume within the mass flow controller. The volume allows the mass flow controller to accurately calculate the flow of gas and/or liquid.

In another embodiment, the controller 618 may be configured to control more than one sensor portions as shown in FIG. 5. As shown in FIG. 5 a second sensor portion 610b may include similar sensors as sensor portion 610a and may operate in parallel to sensor portion 610a. The controller 618 is configured to generate an actual flow 43 and an indicated flow 44 that combines the output from both sensor portions 610a and 610b. Although two sensor portions as shown in FIG. 5, embodiments of the present disclosure are not limited to having two parallel sensor portions, instead, the embodiments may include a plurality of sensor portions and/or a plurality of control portions that operate in parallel or series.

Figure 6:
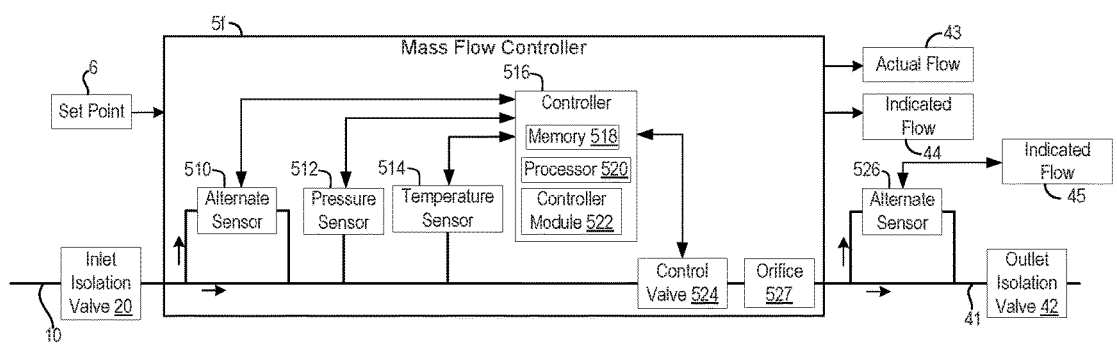
FIG. 6 is a schematic diagram of a flow delivery system, according to an exemplary embodiment.

FIG. 6 illustrates a mass flow controller system according to another embodiment. FIG. 6 shows a mass flow controller 5f, a set point 6, a fluid path 10, a fluid path 10, an inlet isolation valve 20, an actual flow 43, indicated flow 44, indicated flow 45, alternate sensor 526, flow path 41 and outlet isolation valve 42. In some respects, the mass controller 5f is similar to the mass flow controllers 5a-5e. For example, the control value 524 is located after the alternate sensor 510, the pressure sensor 512 and the temperature sensor 514 have measured the fluid flow. Accordingly, the measurements from the alternate sensor 510, the pressure sensor 512 and the temperature sensor 514 are calculated and the control valve 524 may be adjusted based on the readings for at least one of the sensors. The controller 516 may determine the actual flow 43 and the indicated flow 44 based on the sensor reading. The control valve 524 is located in the flow path 10 between the inlet isolation valve 20 and the orifice 527. In alternative embodiments, the control valve 524 may be located after the orifice 527 or the orifice 527 may be located between the control valve 524 and the inlet isolation valve 20.

The mass flow controller system on FIG. 6 also includes an additional alternate sensor 526 that measures the output that is received from the mass flow controller 5f. The additional alternate sensor 526 may indicate to the user of the mass flow controller 5f whether liquid or gas is flowing through the mass flow controller. The alternate sensor 526 may generate an additional indicated flow signal 45 that may be compared with the indicated flow 44 and/or the actual flow 43. In one embodiment, the signal from the alternate sensor 526 may be used to control the control valve 524. Other uses for the signal from the alternate sensor 526 may be possible.

FIGS. 1-6 show a device comprising of a flow measurement system and a flow controlling system. Flow controlling system has thermal sensor, temperature sensor, pressure sensor, control valve, orifice and PCBA. The flow measurement system has MEMS, thermal, velocity, momentum measurement and ultrasonic or others. Flow measurement sensor generates one or more signals that compares against the output of the flow controller system and compares against the set point. If the comparison is out of a user-defined limit, it will send an alarm or a fault to the user. The user can then decide if the user wants to replace the unit or check against an in-situ verification system. Variation of different applications according to FIGS. 1-6. The alternate sensor may be located outside of the system (FIG. 6 or 7) and can be installed independently anywhere in the flow path outside the existing flow controller. The momentum sensor may also be used as the primary or the alternate sensor for either the flow controller or the flow measurement system. (See., FIGS. 1-6)

This technique is beneficial to the user because existing flow controlling system do not provide real-time actual flow measurement information. They only report what the sensed flow according to the sensing technique they are using. This handicaps the user because the user may not know during this process, if the existing flow controller was actually flowing correctly or after a few process steps, the user may get defective or different flow rates. Providing an alternate sensing technique offers the user secondary insurance that will limit how many bad products are made once the flow controlling system has gone out of specification or set point.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system, or a printer circuit board. Embodiments within the scope of the present disclosure include program products comprising machine readable media for carrying or having machine-executable instructions or data structures stored thereon. Such machine-readable media can be any available media that can be accessed by a general purpose or special purpose computer or another machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or another machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted.

Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A device, comprising:
    a primary sensor and a secondary sensor located along a flow path within a flow device; the primary sensor and the second sensor configured to generate a signal that is indicative of a flow rate of material through the flow path;
    an alternate sensor located on a bypass path of the flow path within a flow device; the alternate sensor configured to generate a signal that is indicative of the flow rate of material shunted through the bypass path and to return the material back to the flow path;
    an outside sensor located outside the flow device to measure the flow of material received from the flow device; and
    the flow device configured to compare a signal from the outside sensor with the signal from the primary or secondary or alternate sensor to determine that at least one of the primary or secondary or alternate sensor is malfunctioning.

2. The device of claim 1, wherein the flow device is configured to generate at least one signal based on a difference in flow rate between an actual flow rate determined by the outside sensor and the signal generated by the primary or the secondary sensor.

3. The device of claim 2, wherein the flow device is configured to generate an alarm signal that the actual flow rate and the indicated flow rate are out of preset parameter boundary.

4. The device of claim 1, wherein the secondary sensor is a temperature sensor that is configured to measure a change in temperature of the material flowing through the flow path.

5. The device of claim 4, wherein the primary sensor is a pressure sensor that is configured to measure a change in pressure of the material flowing through the flow path.

6. A method for controlling a mass flow controller, comprising:
    generating signals that are indicative of a flow rate of material through the flow path using a primary sensor and a secondary sensor;
    shunting of a portion of the material through a bypass path;
    generating signals that are indicative of the flow rate of material through the bypass path of the flow path using an alternate sensor;
    returning the portion of the material back to the flow path;
    measuring the flow of material received from the flow path using an outside sensor; and
    comparing a signal from the outside sensor with the signal from the primary or secondary sensor and
    determining that at least one of the primary or secondary sensors is malfunctioning.

7. The method of claim 6, further comprising, generating at least one signal based on a difference in flow rates between an actual flow rate determined by the outside sensor and the signal generated by the primary or the secondary sensor.

8. The method of claim 6, further comprising, generating by the mass flow controller, an alarm signal that the actual flow rate and the indicated flow rates are out of preset parameter boundary.

9. The method of claim 6, wherein the secondary sensor is a temperature sensor that is measuring a change in temperature of the material flowing through the flow path.

10. The method of claim 6, wherein the primary sensor is a pressure sensor that is measuring a change in pressure of the material flowing through the flow path.

11. An apparatus, comprising:
    a primary sensor means and a secondary sensor means for generating a signal that is indicative of a flow rate of material through the flow path;
    an alternate sensor means for generating a signal that is indicative of a flow rate of material shunted through a bypass path and to return the material back to the flow path;
    an outside sensor means for measuring the flow of material received from the flow path; and
    a mass flow controller means for comparing a signal from the outside sensor means with the signals from the primary sensor means or secondary sensor means to determine that at least one of the primary or secondary sensor means is malfunctioning.

12. The apparatus of claim 11, wherein the mass flow controller means for generating at least one signal is based on a difference in flow rates between an actual flow rate and an indicated flow rate.

13. The apparatus of claim 11, wherein the mass flow controller means is generating an alarm signal that the actual flow rate and the indicated flow rates are out of preset parameter boundary.

14. The apparatus of claim 11, wherein the secondary sensor means is a temperature sensor that is configured to measure a change in temperature of the material flowing through the flow path.

15. The apparatus of claim 11, wherein the primary sensor means is a pressure sensor that is configured to measure a change in pressure of the material flowing through the flow path.

* * * * *